(12) United States Patent
Yamada

(10) Patent No.: US 7,284,592 B2
(45) Date of Patent: Oct. 23, 2007

(54) DEVICES AND METHODS FOR MELTING MATERIALS

(75) Inventor: Fujio Yamada, Chiryu (JP)

(73) Assignee: Limtech Corporation, Aichi-ken (JP)

( * ) Notice: Subject to any disclaimer, the term of this patent is extended or adjusted under 35 U.S.C. 154(b) by 474 days.

(21) Appl. No.: 10/793,878

(22) Filed: Mar. 8, 2004

(65) Prior Publication Data

US 2004/0168787 A1 Sep. 2, 2004

Related U.S. Application Data

(62) Division of application No. 09/953,433, filed on Sep. 17, 2001, now abandoned.

(51) Int. Cl.
*B22D 17/08* (2006.01)
(52) U.S. Cl. ...................... 164/312; 164/900
(58) Field of Classification Search ............... 164/113, 164/900, 312
See application file for complete search history.

(56) References Cited

U.S. PATENT DOCUMENTS

| | | | | |
|---|---|---|---|---|
| 4,146,081 | A | * | 3/1979 | Reis .......................... 164/155.5 |
| 5,323,838 | A | * | 6/1994 | Hamashima et al. ......... 164/113 |
| 5,775,403 | A | * | 7/1998 | Premkumar et al. .......... 164/98 |
| 5,860,468 | A | * | 1/1999 | Cook ........................... 164/61 |
| 5,983,978 | A | * | 11/1999 | Vining et al. ................ 164/312 |
| 6,070,643 | A | * | 6/2000 | Colvin ......................... 164/61 |
| 6,098,700 | A | * | 8/2000 | Carden et al. .............. 164/312 |
| 6,425,434 | B1 | * | 7/2002 | Muller ........................ 164/312 |

\* cited by examiner

*Primary Examiner*—Kevin P. Kerns
(74) *Attorney, Agent, or Firm*—Dennison, Schultz & MacDonald

(57) ABSTRACT

A molten material supply unit includes a heating cylinder. The heating cylinder may receive and heat the material in a substantially vacuum condition. A molding apparatus may include a pressurizing and charging unit in addition to the molten material supply unit. The pressurizing and charging unit is adapted to receive the melted material from the molten material supply unit and to charge the melted material into a die under pressure.

14 Claims, 9 Drawing Sheets

DEVICES AND METHODS FOR MELTING MATERIALS

This application is a division of Ser. No. 09/953,433 filed Sep. 17, 2001, now abandoned.

BACKGROUND OF THE INVENTION

1. Field of the Invention

The present invention relates to molten material supply units, and may be, for example, advantageously utilized to melt materials, such as metals and/or mixtures of metal and plastic, that have relatively high melting points. The present invention also relates to molding apparatus (e.g. molding dies) that include such molten material supply units.

2. Description of the Related Art

Die-cast molds (machines) are typically used in order to mold metals into articles of manufacture. Molten metals, such as molten aluminum alloys and magnesium alloys, are usually melted in a blast furnace and then transferred to the die while being exposed to air. Thereafter, the molten metals are injected under pressure into the die. Generally speaking, die-cast molds utilize a piston-cylinder mechanism to pressurize the molten metals, so that the molten metals can be injected into the die under pressure. The injected molten metal is then cooled and solidified within the die, thereby forming a metal molded product.

However, a blast furnace is usually expensive and requires a costly installation. Further, heated gases generated when the metal is melted within the blast furnace and exposed to air may create environmental pollution. Therefore, there is a long-felt need for apparatus and methods that can inexpensively melt materials, including but not limited to metals and metal-plastic mixtures, and preferably minimize environmental pollution.

SUMMARY OF THE INVENTION

It is, accordingly, an object of the present invention to teach improved molten material supply units and molding apparatus having such supply units.

In one aspect of the present teachings, the molten material supply units may be utilized to melt solid or semi-solid materials without using a blast furnace and may preferably reduce (or substantially eliminate) pollutant gases that are discharged into the surrounding environment. Herein, the terms "semi-solid," "semi-melted" and "softened" are intended to mean a state in which the material (e.g. a metal, a metal-plastic mixture or a non-metal organic composition) simultaneously exists in both solid and liquid phases, or a state in which dendrite (solid particles) is dispersed or suspended within a liquid material. Thus, a semi-solid material may be substantially solid, but may be moldable or flexible. In one aspect of the present teachings, the material may not be normally moldable or flexible in its purely solid state, but becomes moldable or flexible in the semi-solid state. Thus, in this aspect of the present teachings, any material that can transition to or assume a softened state may be advantageously melted and processed according to the present teachings.

According to another aspect of the present teachings, molten material supply units are taught that can reduce pollutant gases that are typically generated when the material is melted in the presence of air. Thus, in one embodiment of the present teachings, molten material supply units may optionally include a vacuum heating device. For example, a heating structure may communicate with a vacuum device, such as a vacuum pump. In this aspect of the present teachings, the heating structure may have any appropriate design or configuration, as long as the heating structure is substantially airtight, other than an inlet and an outlet of the heating structure. For example, melting chambers, heating structures and heating cylinders are described further below in representative embodiments of the present teachings. One appropriate class of heaters may, e.g., generate heat by supplying an electric current through an electrically resistive material. However, other types of heaters are naturally contemplated, including heaters that generate heat by combusting a fuel source. Thus, in this aspect of the present teachings, the materials preferably can melt within the heating structure from a solid state or a semi-solid state into a molten state (e.g., a purely liquid state) substantially in the absence of air.

In another aspect of the present teachings, the materials may be supplied into the heating structure one after another (e.g. sequentially) in forms of rods or another convenient configuration, which configuration is not particularly limited in this aspect of the present teachings. In one embodiment of the present teachings, the outer dimension of the material (e.g., a cylinder-shaped rod) preferably substantially corresponds to an inner dimension of the inlet to the heating structure. More preferably, the inner dimension of the inlet is slightly smaller than the outer dimension of the softened material. Thus, in this aspect, the material is preferably in a softened or semi-solid state when it is inserted through an inlet of the heating structure. For example, in another embodiment, the softened material may be forcibly introduced through the inlet of the heating structure. In such case, an airtight seal preferably will be formed at the inlet between the inner wall of the heating structure and the softened material.

In another aspect of the present teachings, the materials may be supplied in the form of a softened cylindrical rod and the inlet may be a device that squeezes the material as the softened metal rod is forced through the inlet, thereby ensuring an air tight seal. The squeezing device may be a ring or any other appropriate structure than has an inner perimeter or diameter slightly less than the perimeter or diameter of the rods. The squeezing device is preferably disposed substantially at or around the inlet of the heating structure. In this embodiment of the present teachings, substantially no air preferably contacts the molten materials within the heating cylinder.

In another aspect of the present teachings, a device may be provided to preheat the material that will be melted (e.g., in the shape of cylinder-shaped rods) before the material is fed into a melting chamber, which may be, e.g., a vacuum heating device. Preferably, the preheating device brings the solid material to a softened or semi-solid state. Thus, the melting process within the melting chamber can be easily and rapidly performed. In addition, the preheated (softened) material may be easily squeezed when being forcibly inserted into the melting chamber.

In another aspect of the present teachings, molding apparatus are taught that can mold the materials while generally reducing or preventing the generation of pollutant gases. The molding apparatus may include a pressurizing and charging unit that may receive the molten materials from the molten material supply unit and may serve to charge the molten materials into a die under pressure. Similar to the molten material supply unit, the pressurizing and charging unit may serve to charge the molten materials into the die in a substantially vacuum condition.

In a further aspect of the present teachings, methods of supplying materials are taught that enable the materials to be molded while generally reducing or preventing the generation of pollutant gases. Representative methods may include heating the materials within a heating structure in a substantially vacuum condition and pushing the materials out from the heating structure. The precise pressure state utilized for the substantially vacuum condition of the present teachings will naturally be determined in accordance with the particular material that will be melted and processed. However, preferably the pressure within the heating structure is less than about 100 mm Hg, more preferably less than about 50 mm Hg and most preferably, less than about 10 mm Hg. Herein, the terms "melting chamber," "heating structure" and "heating cylinder" may generally encompass the same or similar structures.

In a further aspect of the present teachings, methods for molding materials using a die are taught and may include charging the molten (e.g. substantially or purely liquid) materials into the die through a pressurizing and charging cylinder also in a substantially vacuum condition. The above-noted steps may naturally be combined with these steps to provide additional embodiments of the present teachings.

Other objects, features and advantage of the present invention will be readily understood after reading the following detailed description together with the accompanying drawings and the claims.

DETAILED DESCRIPTION OF THE INVENTION

Figure 1:
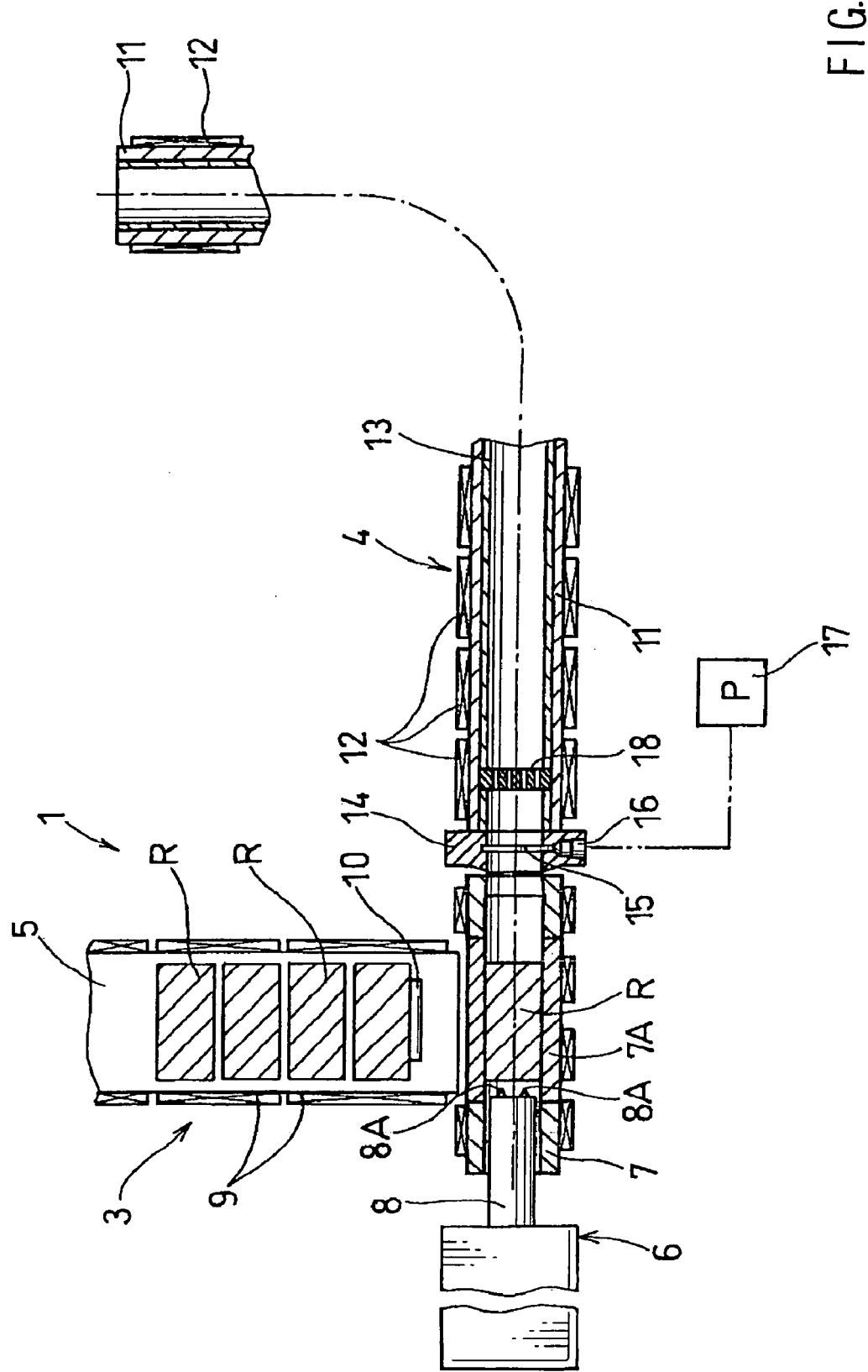
FIG. 1 shows a vertical cross-sectional view of a material supply unit of a first representative metal molding apparatus.

In one aspect of the present teachings, a vacuum-generating device (e.g., any appropriate device that can generate a reduced pressure) is preferably in communication with the interior of the heating structure. Therefore, during the melting operation, a substantial vacuum condition can be created within heating structure. Preferably, the vacuum-generating device (e.g., vacuum pump) may be coupled to the heating structure (e.g. a heating cylinder) at a position that is substantially adjacent to the inlet of the heating structure.

In other representative embodiment of the present teachings, the heating structure may have a substantially cylindrical shape (i.e., a heating cylinder) and the materials may be supplied into the heating cylinder in forms of rods that have a predetermined length. The rods may be sequentially pushed into the heating cylinder and the rods will melt as they move along the length of the heating cylinder.

A squeezing device or member, such as a ring, may be disposed at the inlet of the heating cylinder. The ring may have an inner diameter that is slightly smaller than the diameter of the rods, so that an airtight seal (or at least a substantially airtight seal) will be formed between the ring and the outer surface of the rod when each rod enters the heating cylinder. For example, the rods may be in a softened or semi-solid state and may be forcibly inserted through the inlet and the squeezing device (e.g. a ring). Therefore, the interior of the heating cylinder can be reliably maintained in a substantially vacuum condition, because an airtight seal is formed between the inlet and the inserted material. In another embodiment of the present teachings, a preheating device may heat the rods to a predetermined temperature, which may be a temperature at which the rods become soft. Therefore, the means for squeezing the softened material (e.g. a ring) can effectively maintain an airtight seal between the inlet of the heating structure and the softened material.

In another aspect of the present teachings, a protective layer may cover the inner wall of the heating cylinder and the protective layer preferably does not chemically react with the molten materials disposed within the heating cylinder. If for example the molten materials comprise one or more metals, the protective layer may preferably comprise a ceramic material, ceramic-metal composite and/or chromium oxide. In such case, the protective layer will prevent the molten materials from reacting with the heating cylinder, if it is e.g., formed from a metal, such as iron or steel. As a result, metal by-products (side-products) are not generated, which by-products could stain the molten materials and any resulting molded product.

In another aspect of the present teachings, molding apparatus for molding materials using a die are also taught that may include a pressurizing and charging unit in addition to the molten material supply unit. The pressurizing and charging unit may be arranged and constructed to receive the molten materials from the molten material supply unit and to charge the molten materials into the die under pressure.

In another embodiment of the present teachings, the pressurizing and charging unit may include a charging cylinder and a piston. The charging cylinder may define a space that communicates with the interior of the heating cylinder, so that the space within the charging cylinder also may be brought into a substantially vacuum condition. Therefore, the die can produce molded products while minimizing or eliminating pollutant and/or harmful gases. Naturally, the inner wall of the charging cylinder also may be covered with a protective layer that does not chemically react with the molten materials.

In another embodiment of the present teachings, the heating cylinder may communicate with the charging cylinder via an inlet formed in the charging cylinder. In this case, the piston can move between a retracted position and an advanced position, by which the inlet is respectively opened and closed by the piston.

In a preferred representative embodiment, a hot nozzle may be connected to the charging cylinder, so that the molten materials are charged through a flow channel formed in the hot nozzle. The temperature of the hot nozzle may be appropriately controlled in response to the molding cycle. In particular, the temperature of the hot nozzle may be controlled such that the molten materials only flow out of the charging cylinder during an operation for discharging the molten material from the charging cylinder. Therefore, the molding process can be effectively performed. Preferably, the flow channel of the hot nozzle may be covered with an electrical-insulation layer, which layer may be formed of a ceramic material that does not chemically react with the molten materials.

In another embodiment of the present teachings, the die may include a plurality of cavities, a runner block, and a plurality of second hot nozzles. The runner block may have a plurality of branch channels, so that the molten materials discharged from the first hot nozzle are charged into the cavities through the branch channels and the corresponding second hot nozzles. Therefore, a plurality of products can be molded at one time.

In addition, a plurality of pressurizing and charging units may be disposed in parallel with each other and may have respective first hot nozzles that are connected to the branch channels. This arrangement is advantageous, because any of the pressurizing and charging units may be selectively used in response to the necessary injection pressure for the die to be used for a molding process.

As noted above, methods for supplying a molten material are also taught. Such methods may include heating and melting the materials within a heating cylinder in a substantially vacuum condition, and pushing or discharging the molten materials out of the heating cylinder. Further, the heating cylinder may communicate with a die. Thus, the molten materials can be melted within the heating cylinder and directly (or indirectly) supplied to the die. In a preferred aspect of the present teachings, the heating cylinder, the die, and all communicating portions therebetween, are maintained in a substantially vacuum condition when the material is in a molten state (e.g., a purely liquid state). For example, the material may be heated and melted within a heating cylinder in a substantially vacuum condition, and then charged into the die through a charging cylinder that is also maintained in a substantially vacuum condition.

Each of the additional features and teachings disclosed above and below may be utilized separately or in conjunction with other features and teachings to provide improved material supply units and molding appratus and methods for designing and using such units and appratus. Representative examples of the present invention, which example utilizes many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe a representative example of the invention. Moreover, various features of the representative example and the dependent claims may be combined in ways that are not specifically enumerated in order to provide additional useful embodiments of the present teachings.

Figure 2:
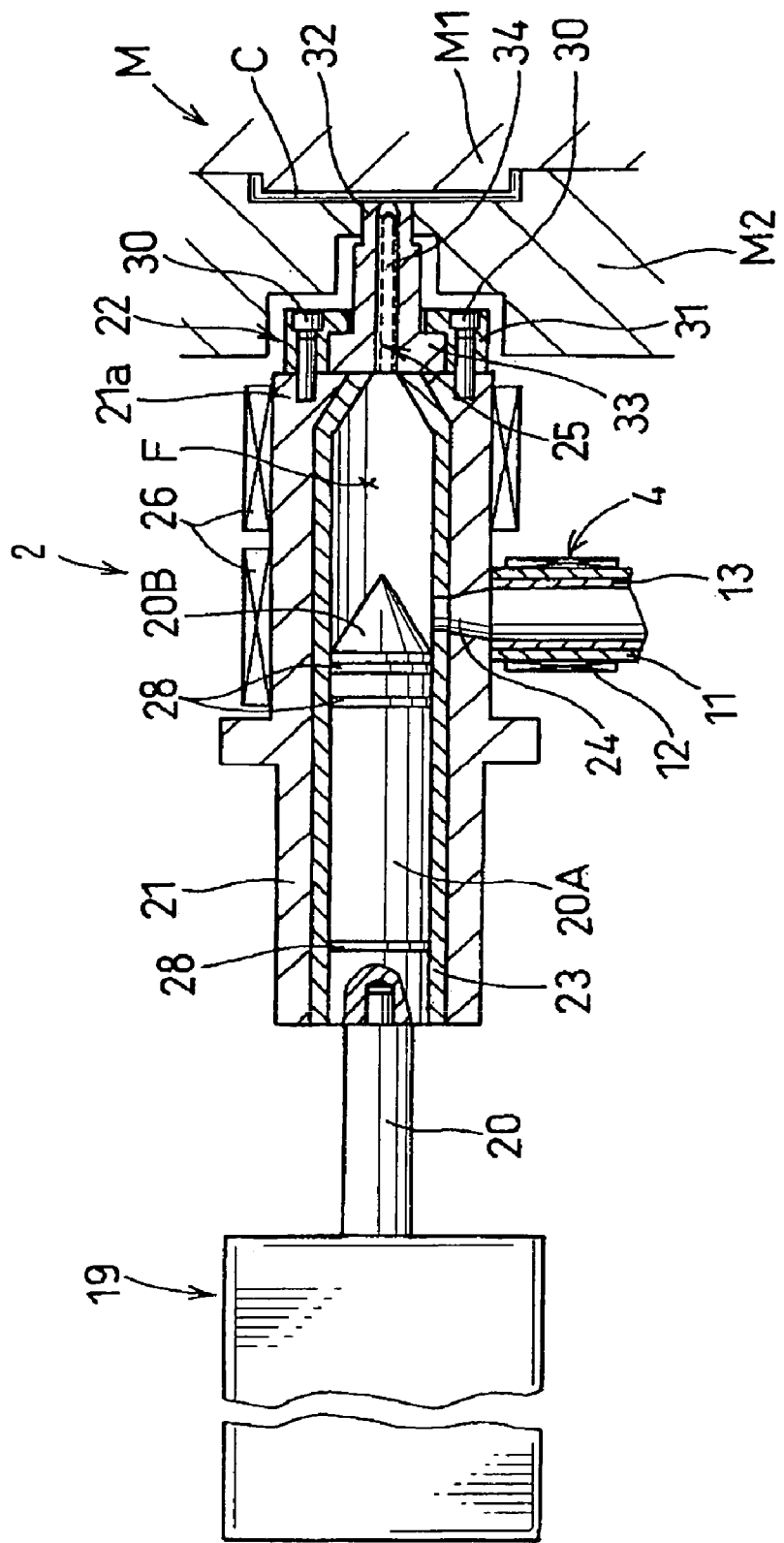
FIG. 2 shows a vertical cross-sectional view of a material charging unit and a part of a die of the first representative metal molding apparatus.

A first representative metal molding apparatus is generally shown in FIGS. 1-8. The first representative metal molding apparatus may include, for example, a molten metal supply unit 1, as shown in FIG. 1, and a pressurizing and charging unit 2, as shown in FIG. 2.

Referring to FIG. 1, the molten metal supply unit 1 may include a preheating section 3 and a vacuum heating section 4. Preferably, the preheating section 3 may include a material stacker 5 and a hydraulic cylinder device 6. A space may be defined within the material stacker 5 to receive cylindrical metal rods R in a vertically stacked row. For example, the metal rods R may be cut from a single long rod to have a predetermined (e.g., constant or uniform) length. Preferably, the length of the metal rods R is determined such that the volume of each metal rod R is substantially equal to the volume of a cavity C of a die M, as will be further explained below. The hydraulic cylinder device 6 may be utilized to push the metal rods R into the vacuum heating section 3 one after another.

In one representative embodiment, the metal rods R may comprise an aluminum alloy and/or a magnesium alloy, which alloy can be suitably molded with the die M shown in FIG. 2, although naturally other metal alloys (as well as metal-plastic mixtures and non-metal materials) are contemplated by the present teachings. In one preferable, but not limiting example, the aluminum alloy may be ADC 12 (Al—Si—Cu family, JIS H 5302) containing about 11% of Si and about 2.5% of Cu, although naturally a variety of other aluminum alloys may be used with the present teachings. In another preferable, but not limiting example, the magnesium alloy may be MD1D (AZ-91 family) containing 8.3 to 9.7% of Al, 0.35 to 1.0% of Zn, greater than 0.15% of Mn, less than 0.10 of Si and small amounts of Cu, Ni and Fe, although again a variety of other magnesium alloys may be used with the present teachings. The hydraulic cylinder device 6 may include a supply cylinder 7 that serves to receive the cylindrical metal rods R that may be gravity fed one by one from the stacker 5 into the supply cylinder 7. The hydraulic cylinder device 6 also may include a pushing piston 8 that serves to push the metal rods R into the vacuum heating section 4.

One or more heaters 9 may be mounted on the outside of the stacker 5 and may serve to preheat the metal rods R to an appropriate temperature, which may be e.g., a temperature that will bring the metal rod R into a softened state. For example, the metal rods R may be heated to a softened state before the metal rods R are supplied to the vacuum heating section 4. Although not shown in the drawings, an upper inlet opening may be defined within the stacker 5 and the metal rods R may be inserted through the upper inlet opening in order to be received within the stacker 5. The capacity of the stacker 5 or the number of metal rods R that can be received within the stacker 5 is not particularly limited and may be suitably determined, e.g., with consideration to the capacity of the pressurizing and charging unit 2. Preferably, a stop 10 may be disposed at the bottom of the stacker 5. An actuator (not shown) may be utilized to horizontally move (i.e. substantially perpendicular to the longitudinal axis of stacker 5) the stop 10, thereby extending the stop 10 into the stacker 5 and withdrawing the stop 5 from the stacker 5. Thus, the stop 10 can be utilized to selectively load or insert the metal rods R into the supply cylinder 7.

Figure 3:
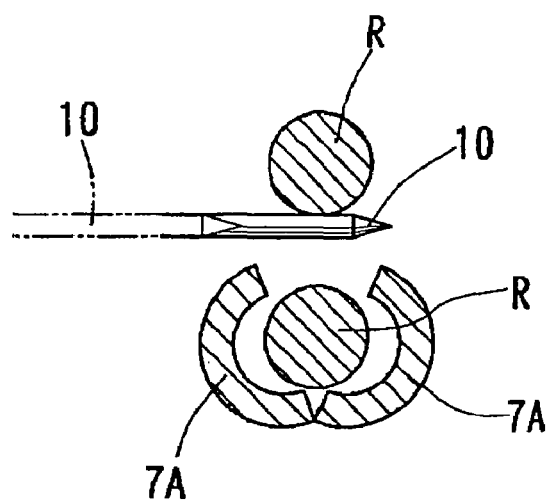
FIG. 3 is an explanatory cross-sectional view showing a representative operation of a pushing cylinder of a representative preheating unit, in which one metal rod drops into two open cylinder halves of the pushing cylinder.

A cross-sectional view of a representative, but not limiting, supply cylinder 7 is shown in FIG. 3. This supply cylinder 7 may be positioned directly below the stacker 5 and may include, e.g., a pair of cylinder halves 7A. A hinge (not shown) may pivotably attach the bottom edges of the cylinder halves 7A and the actuator (not shown) may open and close the cylinder halves. Thus, the cylinder halves 7A may open to receive the metal rods R when the metal rods R are inserted or dropped by withdrawing the stop 10 from the stacker 5. The cylinder halves 7A may then close to allow the pushing piston 8 to push the metal rod R towards the vacuum heating section 4. Preferably, the actuator of the cylinder halves 7A and the actuator of the stop 10 may function together with the hydraulic cylinder device 6, so that the metal rods R are sequentially placed into the supply cylinder 7 and then pushed by the pushing piston 8.

The representative vacuum heating section 4 will now be described in further detail with reference to FIGS. 1 and 5. The vacuum heating section 4 may include a heating cylinder 11 that serves to receive the preheated metal rods R from the supply cylinder 7. In addition, the heating cylinder 11 preferably furthers heats the metal rods R. As a result, the metal rods R may be heated to a higher temperature, thereby completely melting the softened metal rods R into molten metal. Thereafter, the molten metal is supplied to the die M (shown in FIG. 2) for molding. In order to further heat the metal rods R, heaters 12 may be attached to the outer side of the heating cylinder 11.

In another preferable, but optional, embodiment, a protective tube 13 may be inserted into the heating cylinder 11, so that the heating cylinder 11 does not directly contact the molten materials. Preferably, the protective tube 13 may comprise one or more materials that are heat-resistant and that do not chemically react with the molten materials, while providing suitable mechanical strength and a small coefficient of thermal expansion. In one preferable, but not limiting example, ceramics and ceramic-metal composites may be utilized in the protective tube 13. For example, suitable ceramics include $Si_3N_4$ and Sialon™ (HCN-10), which is distributed by Hitachi Metals, Ltd. of Tokyo, Japan. Further, suitable ceramic-metal composites include HFA50, which is also distributed by Hitachi Metals, Ltd.

Although external heaters 12 are illustrated in the first representative embodiment, the particular type of heater that may be used as heaters 12 is not particular limited. For example, internal heaters may be embedded within the heating cylinder 11. In addition, the length of the heating cylinder 11 may be suitably determined by considering the heating capability of the heaters 12 and the melting point of the material that will be melted.

Figure 5:
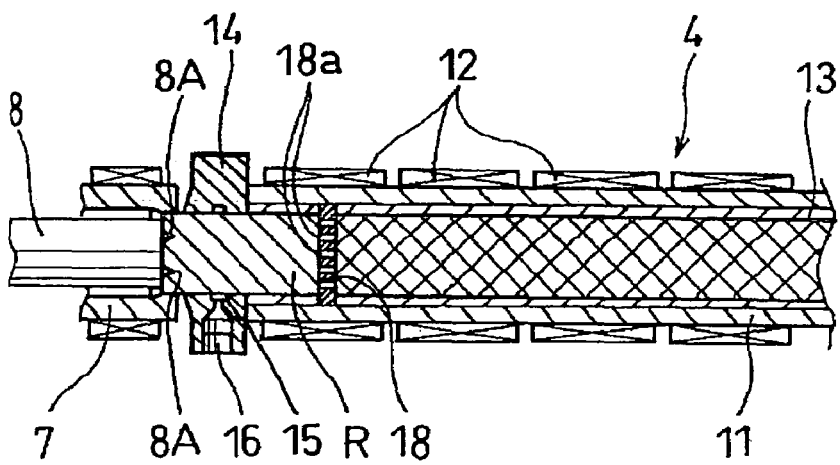
FIG. 5 is a cross-sectional view of the representative heating cylinder and shows a representative operation for charging a semi-melted metal rod into the heating cylinder.

Still referring to FIGS. 1 and 5, an inlet ring 14 may be positioned at the rear end of the heating cylinder 11, so that the ring 14 opposes the front end of the supply cylinder 7 of the preheating section 3. Preferably, the ring 14 may have a relatively high melting point and high mechanical strength, so that the ring 14 can squeeze or to scrape the outer surface of the semi-melted metal rods R. For example, ultra-hard alloys may be utilized to form ring 14. Further, the inner diameter of ring 14 is preferably slightly smaller than the outer diameter of the metal rods R. For example, if the rods R have a diameter of 50 mm, the ring 14 may have an inner diameter of about 49.5 to 49.8 mm.

The inner diameter of the ring 14 may be uniform along the axial (longitudinal) direction of the vacuum heating section 4 or may gradually decrease along the axial (longitudinal) direction. In addition, an annular recess 15 may be formed within the inner peripheral surface of the ring 14 and may communicate with a vacuum pump 17 via a communication port 16. Thus, in a preferred aspect of the present teachings, the inner space of the heating cylinder 11 may be brought into a substantially vacuum condition when the metal rods R are completely melted, as will be further explained below.

Figure 4:
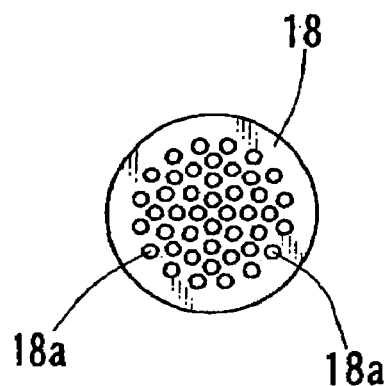
FIG. 4 is a front view of a screen disk that may be disposed within a representative heating cylinder.

In addition, a screen disk 18 may be mounted within the heating cylinder 11 at a position displaced from the ring 14 by a predetermined distance. For example, the distance between the screen disk 18 and the ring may be less than the length of the metal rods R. A representative screen disk 18 is shown in FIG. 4 in greater detail and may have, for example, a plurality of through holes 18a.

Referring back to FIGS. 1 and 5, projections 8A may be formed on the front end surface of the pushing piston 8 of the hydraulic cylinder device 6 and may serve to engage the rear end of the metal rods R. Although not shown in the drawings, a drive device for rotating the pushing piston 8 about the longitudinal axis of the pushing piston 8 may optionally be provided. In that case, the metal rods R will rotate with the pushing piston 8 by engaging by the projections 8A.

The first representative pressuring and charging unit 2 will now be described with reference to FIG. 2. The pressuring and charging unit 2 may be constructed as a die-cast machine and may include a hydraulic cylinder device 19. The hydraulic cylinder device 19 may include a piston member 20A that is connected to a front end of a piston rod 20. The pressurizing and charging unit 2 also may include a charging cylinder 21 that can slidably and movably receive the piston member 20A. A hot nozzle 22 may be attached to a front portion 21a of the charging cylinder 21.

Similar to the heating cylinder 11 of the vacuum heating section 4, a protective tube 23 may be inserted into the charging cylinder 21. The protective tube 23 may be made of the same material as the protective tube 13, although naturally other materials may be utilized. A material charging port 24 may be defined within a side wall of the charging cylinder 21, for example, at a position that is slightly rearward of the middle of the charging cylinder 21 along its longitudinal axis. The charging port 24 preferably communicates with the heating cylinder 11 of the vacuum-heating unit 4, so that the molten materials may be supplied into the charging cylinder 21.

The inner wall of front portion 21a of the charging cylinder 21 preferably becomes narrower toward the front end of the front portion 21a. Further, the front portion 21a preferably communicates with a flow channel 25 defined within the hot nozzle 22. Preferably, heaters 26 may be attached to the outer periphery of the charging cylinder 21, so that the temperature of the molten materials supplied into the cylinder 21 can be suitably maintained.

A front end 20B of the piston member 20A may have a substantially conical configuration so as to substantially conform to the configuration of the inner space of the front portion 21a of the charging cylinder 21. Piston rings 28 may be fitted around the outer periphery of the piston member 20A and may be spaced from each other by an appropriate distance in order to provide a suitable seal between the piston member 20A and the charging cylinder 11. The piston ring 28 may be, for example, made of a material that is the same or similar to the material utilized to form the protective tube 13 or 23, although the piston rings 28 may naturally be constructed from a variety of materials. Moreover, the number of piston rings 28 is not particular limited, and other sealing means may be utilized instead of piston rings 28.

A bracket 31 and bolts 30 may be, for example, utilized to fix the hot nozzle 22 to the front portion 21a of the charging cylinder 21, although other fixing means may be utilized. A front end of the flow channel 25 of the hot nozzle 22 (right side as shown in FIG. 2) may directly open into the cavity C of the die M and the inner diameter may decrease towards the cavity C. A variety of known dies M may be utilized with the present teachings and the construction of the die M is not particularly limited. In the first representative embodiment, a die M is shown that includes a movable die part M1 and a fixed die part M2. A cavity C is defined between the movable die part M1 and the fixed die part M2.

The hot nozzle 22 may preferably be constructed according to the teachings of U.S. Pat. No. 4,648,833, the teachings of which are hereby incorporated by reference herein in their entirety. Therefore, the construction of the hot nozzle 22 will be briefly described herein and the reader is referred to U.S. Pat. No. 4,648,833 for further teachings, if necessary. The construction of the hot nozzle 22 is not particularly limited and may be made of metal, such as iron, that is electrically conductive but has an appropriate electrical resistance.

For example, the hot nozzle 22 may have a pair of slots 34 (only one slot 34 is shown in FIG. 2) that extend from a base portion 33 toward a front end portion 32 by a predetermined distance along the longitudinal direction of the hot nozzle 22. Thus, the slots 34 preferably do not extend past the front end portion 32. AC or DC power may be applied across two parts of the base portion 33 that are separated by the slots 34. As a result, the hot nozzle 22 will internally heat primarily at the front end portion 32.

Although not shown in the drawings, an insulation layer may cover the outer surface of the hot nozzle 22 and the inner surface of the flow channel 25 and the insulation layer preferably may be made of one or more ceramic materials. Ceramic is particularly preferable as the material of the inner layer, because this material may also serve to protect the inner wall of the hot nozzle 22 against the molten metals, which was described above in connection with the protective tube 13 of the heating cylinder 11. By using this arrangement, the temperature of the hot nozzle 22, and in particular the temperature at the front end portion 32, can be reliably and quickly controlled in response to a molding cycle.

A representative molding process will now be described with reference to the above representative embodiment.

(1) First, the metal rods R are sequentially charged into the stacker 5 of the preheating section 3 and the heaters 9 heat the metal rods R to a predetermined temperature, which is preferably about 300° C. for ADC12 (aluminum alloy) and MD1D (magnesium alloy). Therefore, the metal rods R are softened within the stacker 5.

(2) The cylinder halves 7A of the cylinder 7 then open as shown in FIG. 3. The stop 10 moves from a support position, which is directly below the stack of the metal rods R as indicated by solid lines in FIG. 3, to a release position, which is shown in dotted lines in FIG. 3. As a result, the lowermost metal rod R will drop or fall into the open cylinder halves 7A due to gravity. As soon as the lowermost metal rod R (hereinafter also called the "first metal rod R") is released from the stacker 5, the stop 10 returns to the support position so as to prevent the next lowermost metal rod R from dropping into the open cylinder halves 7A. At this time, the. cylinder halves 7A preferably close.

(3) The pushing piston 8 of the hydraulic cylinder device 6 moves forward (rightward as shown in FIGS. 1 and 5) in order to push the first metal rod R though the ring 14, which is positioned on the rear side of the heating cylinder 11, by a predetermined distance. Therefore, the front end of the first metal rod R is positioned rearward (leftward as shown in FIGS. 1 and 5) of the annular recess 15 of the ring 14 by a small distance. Because the inner diameter of the ring 14 is slightly smaller than the diameter of the metal rods R, the first metal rod R will be squeezed by the edge of the rear opening of the ring 14. As a result, an air-tight seal is formed between the inner surface of the ring 14 and the outer surface of a part of the first metal rod R that has been moved into the ring 14. Thus, no gaps exist between the ring 14 and the first metal rod R, which gaps could permit air to be introduced into the heating cylinder 11. Consequently, the inner space of the heating cylinder 11 will be substantially sealed from the outside environment by forcing the first metal rod R through ring 14, which has a slightly smaller diameter that metal rod R.

(4) When the metal rod R is disposed within the heating cylinder 11, the vacuum pump 17 is preferably driven so as to create a substantially vacuum condition (preferably less than about 10 mm Hg in this representative embodiment) within the heating cylinder 11. At the same time, as shown in FIG. 2, the front end 20B of the piston member 20A of the hydraulic cylinder device 19 is positioned so as not to close the port 24 of the charging cylinder 21 that communicates with the interior of the heating cylinder 11. Therefore, a space F is defined within the charging cylinder 21 and space F communicates with the heating cylinder 11. Space F may further communicate with the cavity C of the die M via the flow channel 25 of the hot nozzle 22. As a result, a substantially vacuum condition also may be created within space F the flow channel 25 and the cavity C when the vacuum pump 17 is operated.

(5) Then, the pushing piston 8 moves further towards the ring 14 and also rotates about its longitudinal axis. Because the projections 8A are formed at the front end of the piston 8, the projections 8A may preferably engage the rear end of the first metal rod R, because it is in a softened state. Therefore, the rotational movement of the pushing piston 8 can be effectively transmitted to the first metal rod R. The rotation and the forward movement of the pushing piston 8 may be stopped when the rear end of the first metal rod R reaches a position immediately before the ring 14. Thereafter, the piston 8 may return to the original (resting) position, which is shown in FIG. 1.

(6) The next metal rod R may then be supplied from the stacker 5 into the cylinder 7 in the same manner as described in the above-described Step (2). Thereafter, the next metal rod R may be pushed into the heating cylinder 11 through the ring 14 by means of the pushing piston 8 until the rear end of the metal rod R reaches the position immediately before the ring 14. Therefore, the first metal rod R may be pushed further into the heating cylinder 11 by the next metal rod R., The same operation may be repeatedly performed for the remaining metal rods R in the stacker 5.

As noted above, the screen disk 18 is positioned on the downstream side of the ring 14. Therefore, when the softened metal rods R are pushed into the heating cylinder 11, the screen disk 18 causes the softened metal rods R is split into a plurality of strands by passing through the holes 18a. In addition, because the softened metal rods R are rotated while passing through the screen disk 18, the strands of the softened metal rods R become sheared and chopped up into short strands. As a result, the flowability (thixotoropy) of the molten material and the following molding process using the pressurizing and charging unit 2 can be improved. In particular, the productivity of the dies and the size tolerances of the molded products may be improved.

Because the pushing piston 8 does not move beyond the ring 14 that is positioned rearward of the screen disk 18, the metal rods R cannot be completely sheared and chopped up by one stroke of the pushing piston 8. However, each metal rod R is pushed forwardly (leftward in FIGS. 1 and 5) by the next metal rod R and may rotate together with the next metal rod R, due to frictional force and heat of these rods R. Therefore, the screen disk 18 will also shear and chop up the remaining portion of the metal rods R into short strands.

Thus, the metal rods R are supplied into the heating cylinder 11 one after another and may be sequentially brought from a semi-solid state into a completely melted state by the heating operation of the heaters 12. For example, ADC12 (aluminum alloy) and MD1D (magnesium alloy) may be completely melted at about 580 to 600° C.

(7) After the heating cylinder 11 has become filled with molten material, the pushing operation by the pushing piston 8 may be temporarily stopped. At this stage, the rear portion of the last metal rod R is positioned rearwardly adjacent to the front end of the ring 14.

Figure 6:
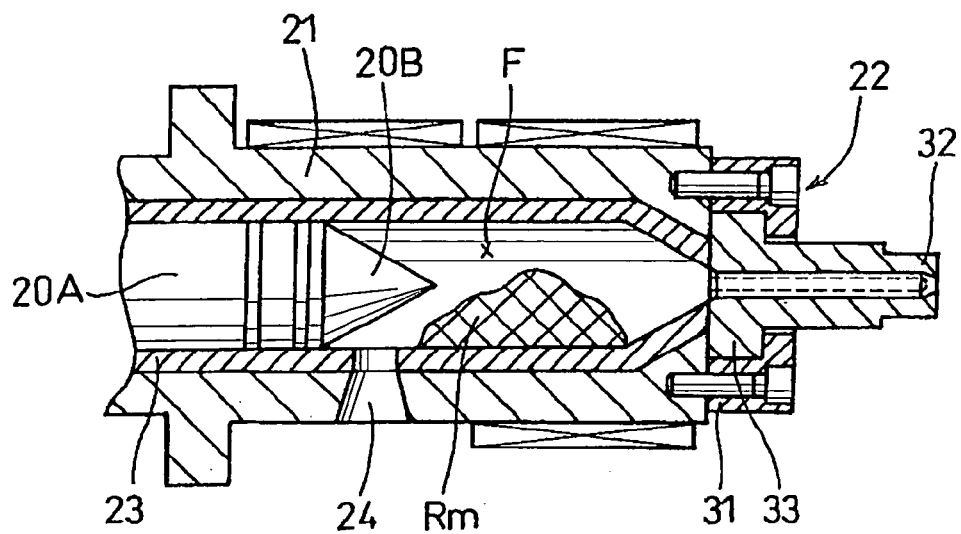
FIG. 6 is an enlarged cross-sectional view of a part of the material charging unit and shows the melted material being supplied into a charging cylinder.

(8) The piston 8 may then move forward and rotate again to push the last metal rod R by a distance that preferably corresponds to a volume V, which may be, for example, a sum of the volume of the cavity C and the volume of the flow channel 25 of the hot nozzle 22. In this representative embodiment, the volume of each of the metal rods R is preferably selected to be equal to the volume of the cavity C and may be less than the volume V Therefore, an additional metal rod R may be supplied to push the last metal rod R, as shown in FIG. 5. As a result, molten metal having a mass Rm may be charged into the space F defined within the charging cylinder 21 of the pressurizing and charging unit 2, as shown in FIG. 6.

Figure 7:
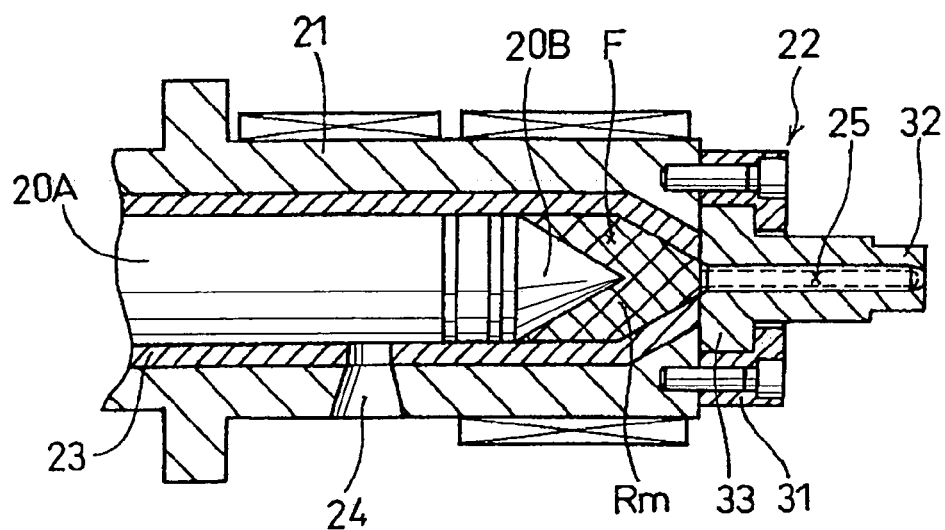
FIG. 7 is an enlarged cross-sectional view similar to FIG. 6, in which a piston has pushed the molten material toward the end of the charging cylinder.
Figure 8:
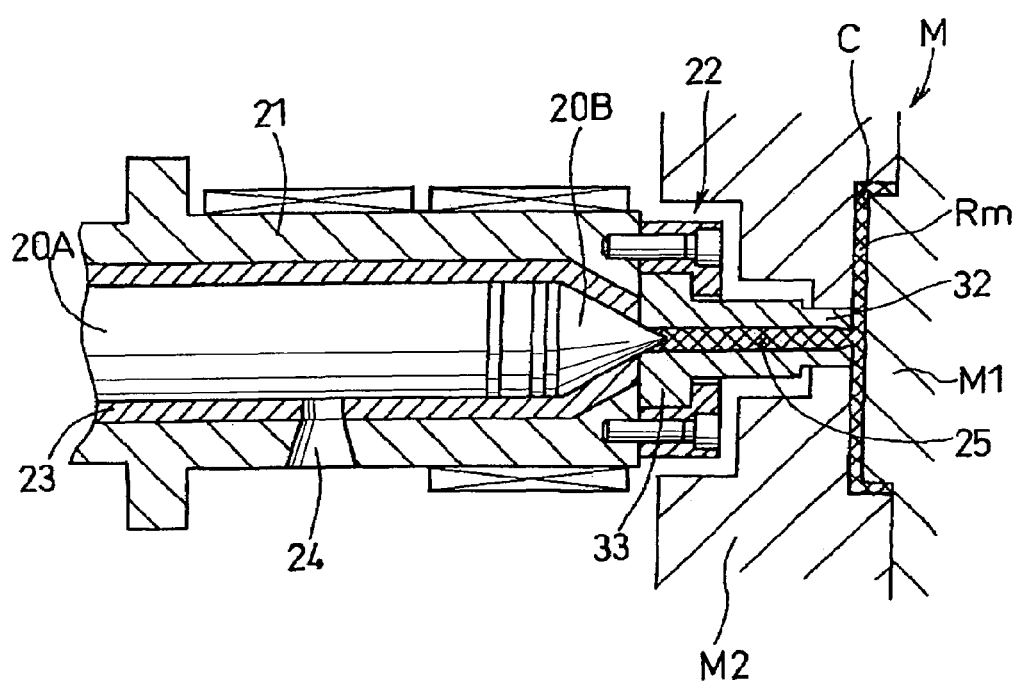
FIG. 8 is an enlarged cross-sectional view similar to FIG. 6, in which the piston has moved to its furthest rightward position in order to charge the molten material into a cavity of the die.

(9) Subsequently, the hydraulic cylinder device 19 may be driven, so that the piston rod 20 moves forwardly (rightward as shown in FIG. 2). Because space F is in a substantially vacuum condition, the movement of the piston rod 20 will cause the mass Rm of molten metal to fill up space F without the inclusion of air, as shown in FIG. 7. When the piston rod 20 reaches the forward stroke end, the molten material may be charged into the flow channel 25 of the hot nozzle 22 and further into the cavity C of the die M. Thus, the cavity C may become completely filled, as shown in FIG. 8.

(10) The die M is then cooled to solidify the molten material within the die M. Thereafter, the movable die half M1 may be separated from the fixed die half M2, so that the solidified material can be taken out of the die M as a molded product. Further, while the die M is cooling, the hot nozzle 22, and in particular the front end portion 32, may be maintained at an appropriate temperature so as to keep the material within the die M in a semi-solid state. Therefore, the molded product can be easily removed from the die M. In addition, the temperature of the nozzle 22 can be adjusted so that the material only flows out of the nozzle 22 during a die charging operation. For example, the nozzle 22 may be maintained at a relatively high temperature during the die charging operation and a relatively low temperature at other times. Therefore, at times other than a die charging operation, the material within the nozzle 22 may re-solidify and thereby provide an airtight seal within the flow channel 25.

(11) After the molded product has been removed from the die M, the movable mold half M1 may return to the original position so as to close the die M. Then, the piston rod 20 or the piston body 20A of the hydraulic cylinder device 18 may also return to the original position, which is shown in FIG. 6. Because a portion of the mass Rm of the now solid or semi-solid material still remains in the hot nozzle 22, the space F within the cylinder 21 returns to the substantially vacuum condition after the piston rod 20 has returned to the original position.

(12) The stacker 5 may then supply the metal rods R for a next molded product into the supply cylinder 7 and the piston 8 may move by one stroke that corresponds to the length of the metal rod R. Again, the stroke length of the piston 8 preferably displaces a volume that is substantially equal to the volume of the cavity C of the die M. As a result, molten material having a volume that corresponds to the volume of the cavity C can be charged into the cylinder 21.

(13) Either before or after Step (12), power may be supplied to the hot nozzle 22, so that the hot nozzle 22 is heated to completely melt the semi-solid material within the flow channel 25. That is, as noted above, the temperature of hot nozzle 22 can be reduced when hot nozzle 22 is not charging melted material into die M. Therefore, space F can be maintained in a substantially airtight condition, due to solidification (partial or complete) of the molten material disposed within hot nozzle 22.

(14) The piston member 20A of the hydraulic cylinder unit 19 may then move forwardly to charge the molten material into the cavity C. This operation may be performed in the same manner as explained in connection with the first molded product and with reference to FIGS. 6 to 8, except that the material is already charged into the flow channel 25 of the hot nozzle 22. Thereafter, the die M is cooled and the molded product is taken out of the die M in the same manner as in the above-described Step (10).

(15) Naturally, steps (11) to (15) may be repeatedly performed so as to mold additional products.

In this representative embodiment, the molten metal supply unit 1 includes the vacuum pump 17, which communicates with heating cylinder 11 and serves to reduce the pressure within the heating cylinder 11. Therefore, the semi-melted metal rods R can be heated substantially in the absence of air or oxygen. As a result, it is not necessary to use a special blast furnace with the present teachings. In addition, little or no heated gas vapor may be produced during the melting step. Further, the vacuum pump 17 may draw out any vapors that may be produced and these vapors can then be properly handled in order to limit or avoid environmental pollution. Furthermore, because the heating process within the cylinder 11 can be performed in a substantially vacuum condition, little or no air will be included within the molten materials. As a result, the molten metal supply unit 1 can be advantageously used as a material supply unit for the pressuring and charging unit 2 that is used with the die M for molding products.

More specifically, when the piston member 20A returns from the most advanced position to the most retracted position, a reduced pressure or a vacuum may be created within the space F Because the vacuum pump 17 is connected to the heating cylinder 11, the reduced pressure within the space F will balance or equalize with the reduced pressure generated by the vacuum pump 17. As a result, the molten materials within the heating cylinder 11 generally do not flow into the space F. Therefore, after the piston member 20A moves to the most retracted position, the molten materials may be supplied into the space F by the molten metal supply unit 1 in an amount that precisely conforms to the volume of cavity C (i.e., an amount that is required to mold one product within the die M). The molten materials may then be charged into the cavity C of the die M through the hot nozzle 22 by an amount that is substantially equal to the amount that has been supplied from the molten metal supply unit 1 into the charging cylinder 21.

Because the space F is maintained in a substantially vacuum condition, the material within the heating cylinder 11 generally does not receive any pressure that would push the material back into the heating cylinder 11, even when the piston member 20A retracts. Thus, the materials can be reliably supplied from the heating cylinder 11 in a fixed (i.e. constant) amount without being influenced by the retracting movement of the piston member 20A. Therefore, the molding process can be smoothly and reliably performed. In addition, a valve or valve means is not required at the outlet of the heating cylinder 11 in order to interrupt the communication between the space F and the interior of the heating cylinder 11 during the movement of the piston member 20A.

Further, because the space F, as well as the interior of the cylinder 11, can be maintained in a substantially vacuum condition, the molten materials can be charged into the die M without including any air in the molten materials. Therefore, the quality and the yield of the molded products may be improved. Further, this aspect of the present teachings makes the present representative method particularly advantageous, even for materials that are not required to be melted under reduced pressure conditions in order to minimize pollutant gases. Therefore, this aspect of the present teachings can be effectively utilized with a wide variety of materials that will be melted from a solid state and discharged to another tool or machine for further manipulation of the liquid material.

In particular, because the vacuum pump 17 is connected to the ring 14 at the inlet of the heating cylinder 11, the outer periphery of the metal rod R may be absorbed toward the inner periphery of the ring 14 due to the reduced pressure. As a result, the reduced pressure also may serve to hold the metal rods R within the ring 14 and to hold the upstream side of the melting metal rods R within the heating cylinder 11.

In addition, the metal rods R may be sequentially pushed into the heating cylinder 11 by the hydraulic cylinder device 6 and the volume of the metal rod R may be determined to be equal to the volume of the cavity C of the die M. Therefore, the molten materials may be supplied into the cylinder 21 of the pressuring and charging unit 2 by an amount that is necessary for one product while the metal rod R is pushed into the heating cylinder 11 by a distance corresponding to the length of the metal rods. Therefore, the amount of the molten material supplied into the charging cylinder 21 can be easily controlled.

Further, because the metal rods R may be preheated by the preheating unit 3 before they are supplied into the heating cylinder 11, the metal rods R may be easily quickly melted within the heating cylinder 11. In addition, because the metal rods R may be squeezed or scraped by the ring 14 at the inlet of the heating cylinder 11, no gaps exist between the ring 14 and the metal rods at the inlet of the heating cylinder 11. Therefore, air can be reliably prevented from entering the heating cylinder 11, so that the interior of the heating cylinder 11 can be reliably maintained in a substantially vacuum condition.

Furthermore, because the protective tube 13 can be inserted into the heating cylinder 11, the heating cylinder 11 preferably does not directly contact the molten materials. In particular, because the protective tube 13 may be made of materials, such as ceramic, that do not chemically react with the molten metals, such as aluminum alloy, the formation of metal by-products may be prevented. Therefore, the heating cylinder 11 may be protected from being damaged by the creation of such metal by-products. As a result, the heating cylinder 11 may have a long lifetime and may be made of materials, such as steel or iron, which are commonly and economically used for mechanical parts.

In addition, the inner wall of the charging cylinder 21 of the pressurizing and charging unit 2 may be protected by the protective tube 23. Further, the inner wall of the flow channel 25 of the hot nozzle 22 also may be protected by a protective layer, which may serve as an insulating layer and also may serve to protect the hot nozzle 22 from the molten materials in the same manner as the protective tubes 13 and 23. Therefore, the formation of metal by-products can be prevented throughout the flow path from the heating cylinder 11 to the cavity C. As a result, the useable lifetime of the heating cylinder 11, the cylinder 23 and the hot nozzle 22 may be increased and the quality and yield of the molded products may be improved.

Preferably, the materials of the protective tubes 13 and 23 and the inner layer of the flow channel 25 of the hot nozzle 22 may be selected to prevent the creation of metal by-products with the variety of alloys, which may include aluminum alloys and magnesium alloys, that are melted in heating cylinder 13. In particular, ceramics, ceramic-metal composites and chromium oxide coatings may provide a satisfactory result for this purpose.

In addition, the front end portion 32 of the hot nozzle 22 may contact the fixed die half M3. In that case, the molten materials within the front end portion 32 of the hot nozzle 22 may be cooled rapidly as the fixed die half M3 is cooled in order to solidify the molten material within the cavity C. Therefore, the remaining (solid or semi-solid) material within the hot nozzle 22 may serve to interrupt communication between the cavity C and the space F of the cylinder 23. As a result, a valve means is not required in order to seal the space F from the outside. In addition or in the alternative, a valve means is not required to maintain the space F in the substantially vacuum condition when the piston member 20A has retracted and the cavity C has been opened in order to take the molded product out from the die M.

Further, the use of the hot nozzle 22 in association with the pressuring and charging unit 2 may enable the production of molded products that do not have unnecessary appendages, such as runners, spools, biscuits and overflows, that typically accompany products that are molded using known die-casting apparatus. Because appendages are not formed, manufacturing costs of the molded products may be reduced and the molding cycle may be shortened. In addition, if it is not necessary to remove appendages from the molded products, manufacturing costs naturally will be further reduced. In general, the appendages that are removed from the molded products of known die-casting apparatus are usually melted again and are mixed with fresh metal materials so as to be used again (recycled) in the molding process. However, according to this representative embodiment, it is not necessary to melt such appendages, because such appendages are generally not produced in the first place. In addition, the molded products are stable in quality, because the molding process can be always performed using fresh materials.

Figure 9:
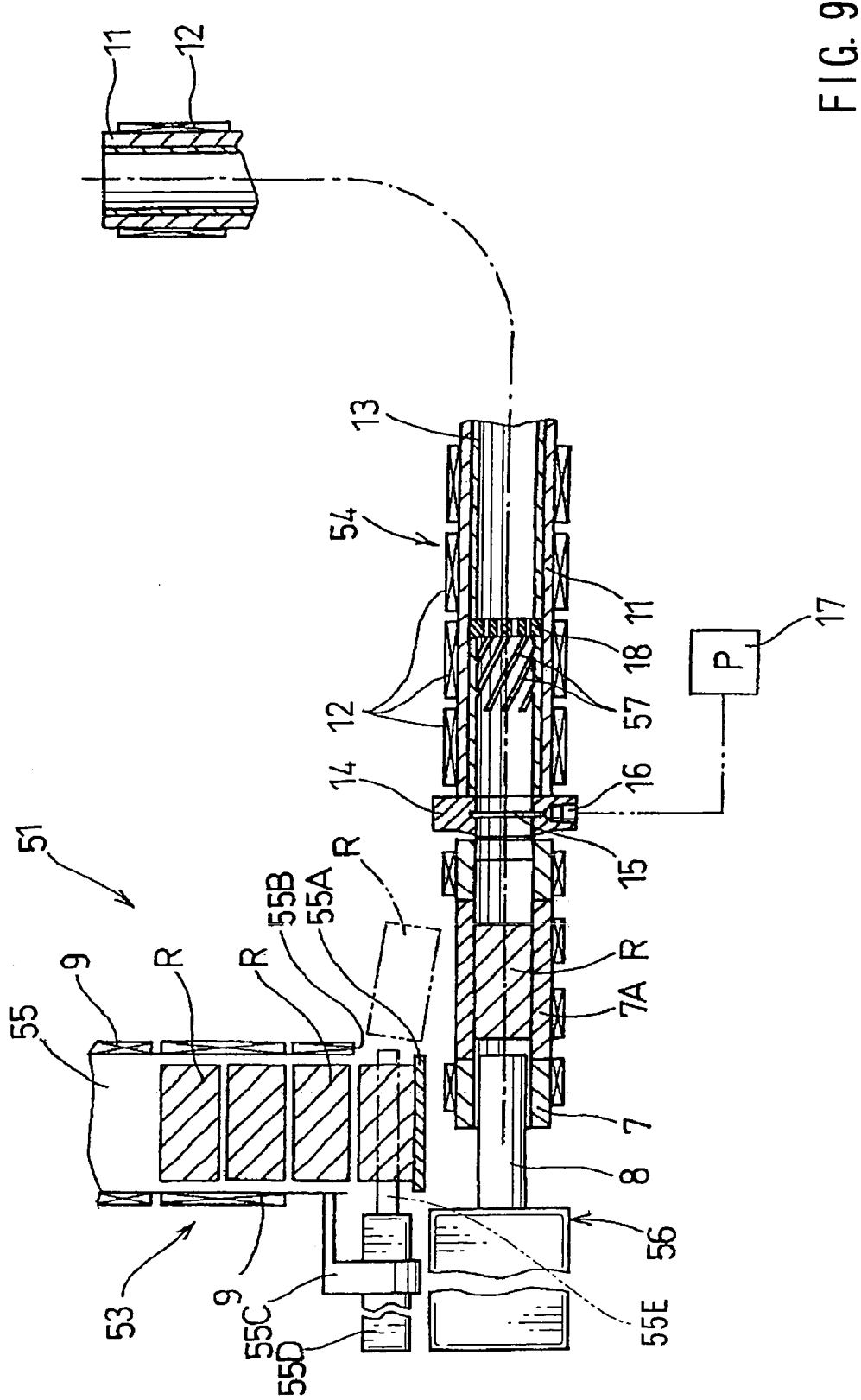
FIG. 9 is a cross-sectional view of a second representative material supply unit.

A second representative embodiment of a material supply unit will now be described with reference to FIG. 9. A material supply unit 51 of this representative embodiment may include, for example, a preheating unit 53 and a vacuum heating unit 54, which may substantially correspond to the preheating unit 3 and the vacuum heating unit 4 of the first representative embodiment. Therefore, in FIG. 9, similar structures, which were described in further detail with respect to the first representative embodiment, are given the same reference numerals.

The preheating unit 53 may include a stacker 55 and a hydraulic cylinder device 56. Similar to the stacker 5 of the first representative embodiment, the stacker 55 may serve to receive or hold metal rods R in a vertical row or stack. However, the stacker 55 may differ from the stacker 5 in that the stacker 55 does not store the metal rods R in a position directly above the cylinder halves 7A of the cylinder 7. Instead, the metal rods R may be stored in a position rearward (leftward as viewed in FIG. 9) of the cylinder halves 7A. In addition, the stacker 55 may include a fixed bottom plate 55A that supports the row or stack of the metal rods R from the lower side. Further, openings 55B may be formed on both front and rear sides of the stacker 55 and adjacent to the bottom plate 55A. Preferably the openings 55B may have a height that is slightly greater than the diameter of the metal rods R. A piston-cylinder device 55D may be mounted on the rear side of the stacker 55 by means of a bracket 55C. In this case, the lowermost metal rod R within the stacker 55 may be pushed out of the stacker 55 via the front opening 55B by means of a piston rod 55E of the piston-cylinder device 55D. Therefore, the lowermost metal rod R may drop into the open cylinder halves 7A due to gravity. Similarly, the remaining metal rods R within the stacker 55 may also drop due to gravity until the next lowermost rod R drops onto the bottom plate 55A. The operation of the cylinder halves 7A may be substantially the same as the operation described in connection with the first representative embodiment. Thus, upon receiving the metal rod R, the cylinder halves 7A may close and the pushing piston 8 of the hydraulic cylinder device 56 may then move to push the metal rod R into a vacuum heating section 54.

By arranging the stacker 55 in this manner, a movable member is not required to support the weight of the stack of the metal rods R, as opposed to the stop 10 of the first representative embodiment. Therefore, the durability of parts of the stacker 55 may be improved and the stacker 55 may reliably operate to supply the metal rods R into the supply cylinder 7.

The construction of the vacuum heating section 54 may be substantially the same as the vacuum heating section 4 of the first representative embodiment. However, the internal construction of the heating cylinder 11 may be altered. For example, within the heating cylinder 11 of the second representative embodiment, the screen disk 18 may be positioned slightly forward of the position of the screen disk 18 in the first representative embodiment. In addition, a plurality of parallel spiral projections 57 may be formed on the inner wall of the protective tube 13 in a position forwardly adjacent the screen disk 18.

With this arrangement, the semi-melted metal rods R, which are pushed into the heating cylinder 11 by the pushing piston 8, may be deformed by rotating along the spiral projections 57 before reaching the screen disk 18. As a result, the metal rods R may be formed into strands and may be sheared into short strands as they pass through the screen disk 18. Therefore, the material may have an improved flowability or thixotoropy in the same manner as the first representative embodiment.

Thus, according to this second representative embodiment, the metal rods R can be rotated without having to rotate the pushing piston 8 of the hydraulic cylinder device 56. Therefore, the hydraulic cylinder device 56 may have a relatively simple construction. In addition, the projections 8A at the front end of the pushing piston 8, which were utilized in the first representative embodiment, can be omitted in the second representative embodiment.

Although the pressuring and charging unit 2 of the first representative embodiment is used in combination with the die M that has a single cavity C, the same pressuring and charging unit 2 can also be used in combination with a die that has a plurality of cavities.

Figure 10:
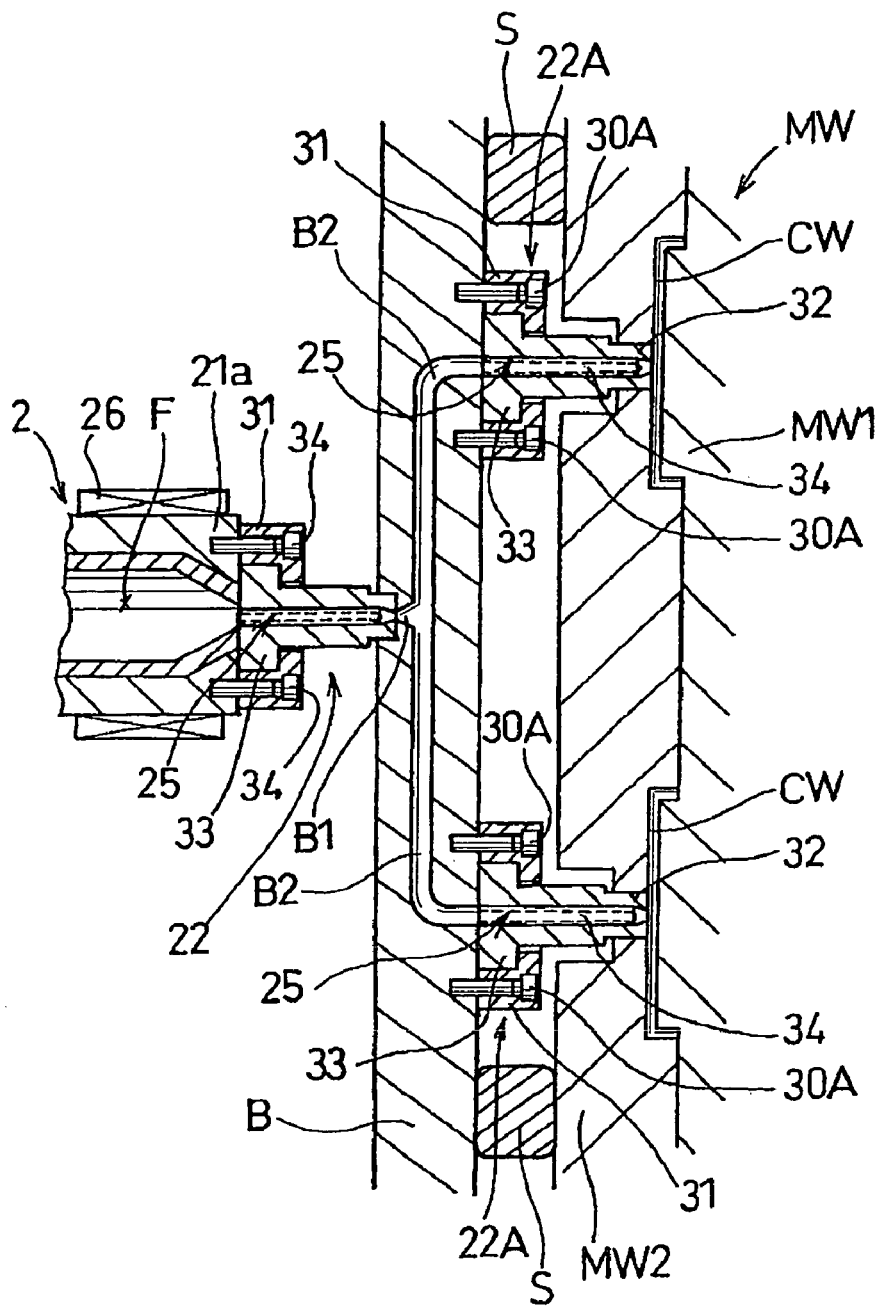
FIG. 10 is a cross-sectional view of a part of a charging unit and a die of a second representative molding apparatus.

Therefore, a second representative embodiment of a metal molding apparatus will now be described with reference to FIG. 10. In FIG. 10, similar structures, which were described in further detail with respect to the first representative embodiment, are given the same reference numerals.

A pressurizing and charging unit 2 is shown partially in FIG. 10 and may have substantially the same construction as the pressurizing and charging unit 2 of the first representative embodiment. A die MW may include a movable die half MW1 and a fixed die half MW2 that define a pair of cavities CW therebetween. A runner block B may be fixed to the fixed die half MW2 and may be spaced from the fixed die half MW2 by means of a spacer S.

In this representative embodiment, a pair of additional hot nozzles 22A may be incorporated in order to charge the molten materials into the respective cavities CW. The hot nozzles 22A may be secured to the front surface of the runner block B by means of bolts 30A. The front surface of the runner block B may oppose the fixed mold half MW2. Each of the hot nozzles 22A may have the same construction as the hot nozzle 22 and may have a flow channel 25 formed therein. The flow channel 25 of each hot nozzle 22A may have a front end that directly opens into the corresponding cavity CW and that has a diameter that decreases toward the corresponding cavity CW.

An inlet port B1 and a pair of branch channels B2 may be formed in the runner block B. The inlet port B1 may open at the rear surface of the runner block B and may communicate with the flow channel 25 of the hot nozzle 22 mounted on the front end 21a of the charging cylinder 21 of the pressurizing and charging unit 2. One end of each of the branch channels B2 may communicate with the inlet port B1. The other end of each of the branch channels B2 may open at the front surface of the runner block B and may communicate with the flow channel 25 of the corresponding hot nozzle 22A.

Thus, in this representative embodiment, the hot nozzle 22 at the front end of the cylinder 21 does not serve to directly charge the molten materials into the cavities CW, but instead serves to supply the molten materials into the inlet port B1 of the runner block B. Therefore, during the molding process, the temperature of the hot nozzle 22 is not required to be controlled in response to the molding cycle as in the first representative embodiment. Instead, the temperature of the hot nozzle 22 may be controlled so as to normally maintain the material in an appropriate melted state that is suitable for charging into the mold MW.

A representative method for using this representative embodiment will now be explained. In the same manner as described in connection with the first representative embodiment, the piston member 20A of the hydraulic cylinder device 19 (not shown in FIG. 10) may be driven to push the mass Rm of the molten material that has been supplied into the space F Therefore, the mass Rm may flow into the inlet port B1 of the runner block B via the flow channel 25 of the hot nozzle 22. The mass Rm may then flow into the flow channels 15 of the hot nozzles 25A via the branch channels B2 of the runner block B and may further flow into the cavities CW. The temperature of the hot nozzles 22A may be controlled in the same manner as described in connection with the hot nozzle 22 of the first representative embodiment. As a result, a pair of products may be molded at the same time in the respective cavities CW The molding process may be substantially performed according to the same Steps (1) to (15) as described in the first representative embodiment, except for the following changes in these steps:

(a) The volume of each of the metal rods R is preferably selected to be equal to the sum of the volumes of the two cavities CW.

(b) In the initial Step (5) for pushing the first lowermost metal rod R, the stroke of the pushing piston 8 is determined to correspond to the sum of the volume of the two cavities CW, the volume of the flow channels 25 of the hot nozzle 22 and the hot nozzles 22A, and the volume of the inlet port B1 and the branch channels B2.

In addition, in this representative embodiment, the hot nozzle 22 can be mounted on the front portion 21a of the cylinder 21 even though the hot nozzles 22A directly open into the corresponding cavities CW This arrangement is advantageous when the die MW, which includes the runner block B, is replaced with another die for molding a different product. Thus, the die MW can be easily removed from the pressurizing and charging unit 2 and the material within the hot nozzle 22 does not flow out of the front end. Thus, the temperature of the front end of the hot nozzle 22 may be set to a temperature that will bring the metal material into a semi-melted or solid state in order to seal the hot nozzle 22.

In addition, in order to restart the molding process, the hot nozzle 22 may be quickly heated to melt the material within the hot nozzle 22 after the new die for the different product has been coupled to the hot nozzle 22. Although not shown in the drawings, the combination of the pressurizing and charging unit 2 and the mold ME of this representative embodiment can also be used in combination with the material supply unit 51 that was described above with reference to FIG. 9. Of course, the die MW may have three or more cavities CW and three or more hot nozzles 22A may be incorporated in order to correspond to the number of cavities CW.

Figure 11:
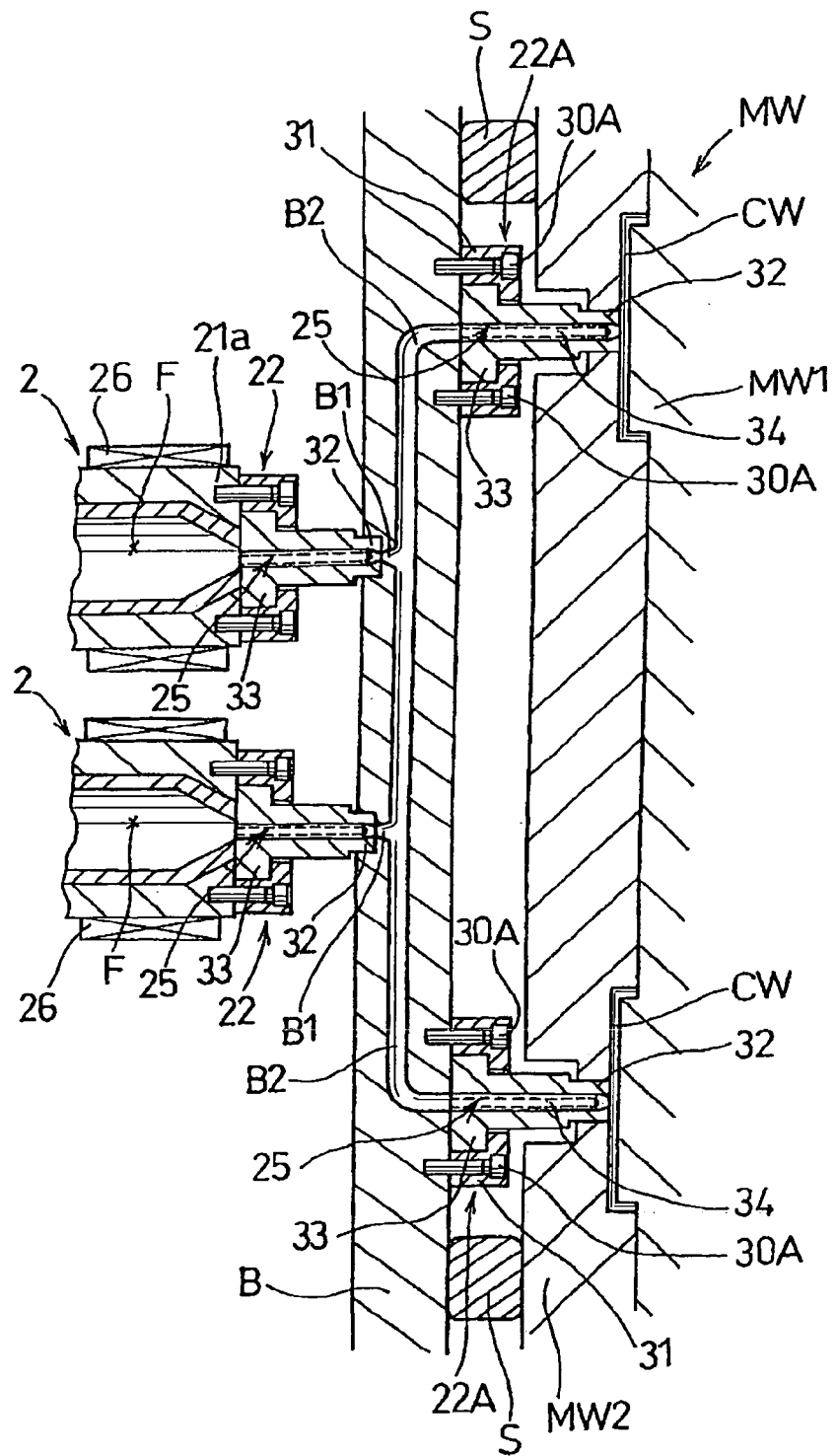
FIG. 11 is a cross-sectional view of parts of a pair of charging units and a die of a third representative molding apparatus.

In the above representative embodiments, one pressurizing and charging unit 2 and one material supply unit 1 (or 51) are used for the die MW, which has a plurality of cavities CW. However, in some cases, the pressurizing and charging unit 2 (or the pressurizing ability) can not adequately charge the molten materials into a plurality of cavities. In such a case, increased force may be generated by replacing the hydraulic cylinder unit 19 with a more powerful cylinder unit and/or by increasing the diameter of the cylinder 21. More preferably, as shown in FIG. 11, a plurality of pressurizing and charging units 2 (two units 2 are shown in FIG. 11) may be disposed in parallel with each other. In this connection, two inlet ports B1 may be formed in the runner block B and may be connected to the branch channels B2. In addition, two material supply units 1 or 51 (not shown) may be associated with the respective pressurizing and charging units 2. In FIG. 11, similar structures are given the same reference numerals as FIG. 10.

Thus, if each of the pressurizing and charging units 2 can generate an injection force of 350,000 kgf, an injection force of 700,000 kgf will be available for the die MW. The number of pressurizing and charging units 2 may be appropriately determined according to a maximum possible injecting force required for the die.

With this arrangement, parts of the pressurizing and charging units 2 can be commonly used, so that the administration of parts and the maintenance work can be simplified. In addition, comprehensive control of maintenance work can be performed according to an operation manual, so that the molding process can be reliably performed. Furthermore, if the die MW is replaced with another die that requires a relatively lower injection pressure, the injection pressure generated by the combination of pressuring and charging units 2 may be too high for the replacement die. In such a case, the operation of one or more of the pressurizing and charging units 2 may stopped. Therefore, the arrangement of this representative embodiment can rapidly and easily cope with changes in the necessary injection pressure.

In the above representative embodiments, the material supply unit 1 or 51 is used in combination with the pressurizing and charging unit 2 of a piston-cylinder type. However, the metal supply unit of these representative embodiments may also be used in combination with a variety of pressurizing and charging units other than piston-cylinder type units. In addition, the metal supply units also may naturally be used for purposes other than a molding process.

In addition, in the above representative embodiments, the pressuring and charging unit 2 having the hydraulic cylinder device 19 is provided separately from the vacuum-heating section 4. However, the pressurizing and charging unit 2 may be integrated with the vacuum-heating section 4 so as to eliminate a separate charging cylinder 21 and a hydraulic cylinder device 19. Such an alternative embodiment will now be described with reference to FIG. 12.

Figure 12:
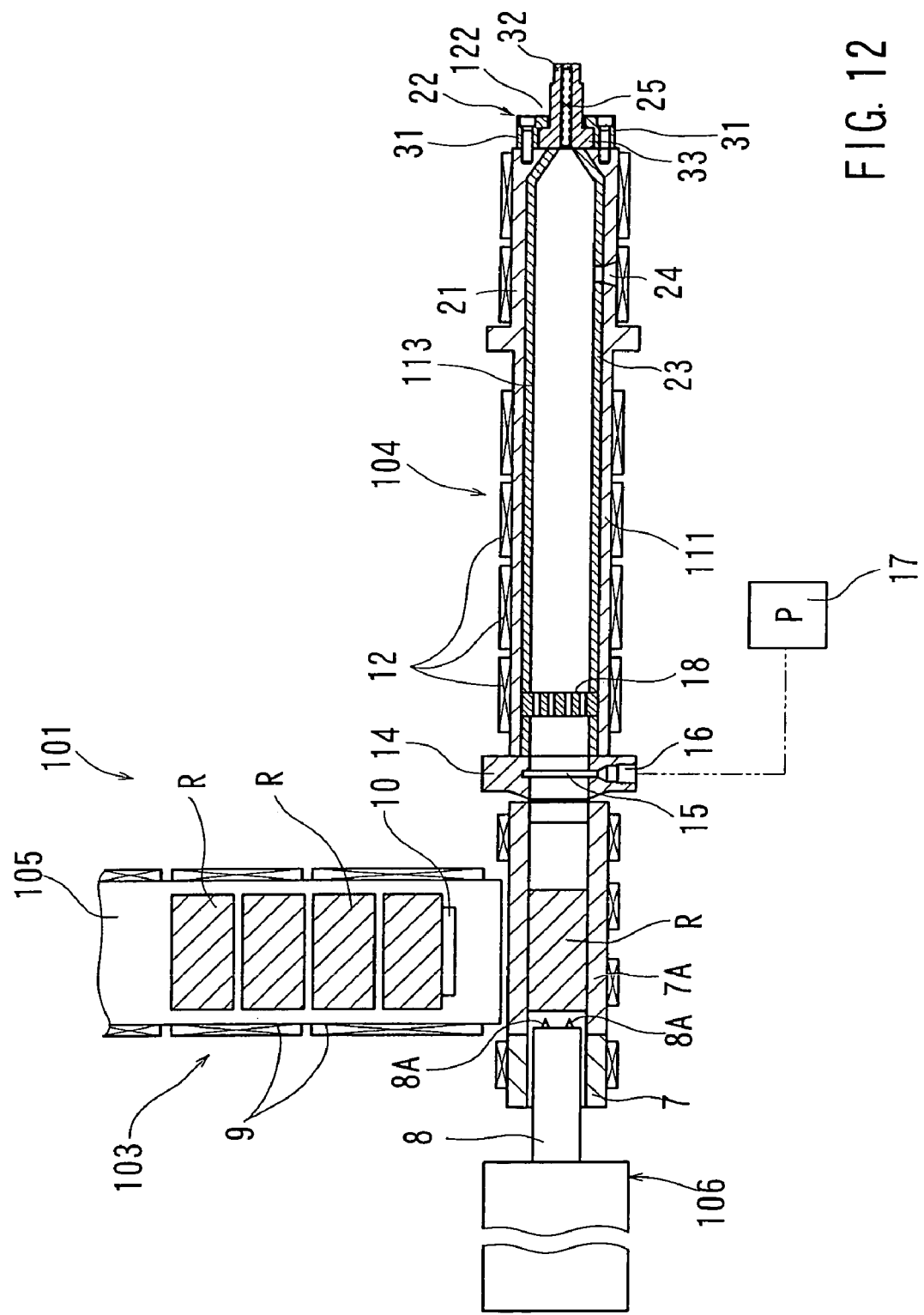
FIG. 12 shows a vertical cross-sectional view of a material supply unit of a further metal molding apparatus according to the present teachings.

Referring to FIG. 12, a molten metal supply unit 101 is shown that generally comprises a preheating section 103 and a vacuum heating section 104. Similar to the first representative embodiment, the preheating section 103 may include a material stacker 105 and a hydraulic cylinder device 106. The material stacker 105 and the hydraulic cylinder device 106 can be similar in construction to the respective material stacker 5 and the hydraulic cylinder device 106 of the first embodiment. The vacuum heating section 104 preferably includes a heating cylinder 111 and a protective tube 113 that may respectively correspond to the heating cylinder 11 and the protective tube 13 of the first representative embodiment. The vacuum heating section 104 differs from the vacuum heating section 104 of the first representative embodiment in that a hot nozzle 122, which may be similar to the hot nozzle 22 of the charging cylinder 21 of the first representative embodiment, is attached to the front end of the heating cylinder 111. In addition, the inner wall of the front end of the heating cylinder 111, as well as that of the protective tube 113, is tapered in the direction towards the hot nozzle 122 in the same manner as the front end of the charging cylinder 21 of the first representative embodiment. In other respects, this embodiment can provide substantially the same results as the first representative embodiment. Therefore, in FIG. 12, similar structures are given the same reference numerals as utilized in FIGS. 1 to 8.

According to this representative embodiment, the hydraulic cylinder device 106 of the preheating section 103 may also serve to charge the molten material into the cavity C of the die M through the hot nozzle 122. Thus, before the molding cycle is started, the preheated metal rods R are sequentially charged into the heating cylinder 111 by the piston 8 of the hydraulic cylinder device 106. At the same time, the heating cylinder 111 is heated, so that the heating cylinder 111 becomes filled with the molten material. Then, the molding cycle is started and the piston 8 of the hydraulic cylinder device 106 moves forward to push the rearmost preheated rod R into the heating cylinder 111 by a distance that corresponds to the volume of the cavity C. Consequently, the cavity C will be filled with the molten material.

Thus, in this representative embodiment, the rods R are completely melted within the heating cylinder 111. As a result, the heating cylinder 111 may have a length that is greater than the length of the heating cylinder 11 of the first representative embodiment so as to provide a relatively long heating area. In the alternative, additional heaters (not shown) may be mounted on or may be embedded within the heating cylinder 111, so as to increase the heating capability. The molten material is then cooled and taken out from the die M as an article of manufacture in the same manner as described in connection with the first representative embodiment. The molding cycle naturally can be repeated to sequentially mold a plurality of articles. Of course, during the molding cycle, the ring 14 preferably seals the inlet of the heating cylinder 111. Thus, the molten material within the heating cylinder 111 is prevented from being exposed to the outside environment, due to the reduced pressure generated by the vacuum pump 17.

One advantageous feature of this representative embodiment is the pressuring and charging unit 2, and in particular the hydraulic cylinder device 19, is not required. Of course, the arrangements shown in FIGS. 10 and 11 also may be adapted to and utilized with this representative embodiment.

Although the hot nozzles 22, 22A and 122 are self-heating in the above representative embodiments, any type of hot nozzle may be used, such as hot nozzles having a separate external or internal heater.

In addition, although the metal rods R of the above representative embodiments have a circular sectional configuration, the metal rods R may have a variety of other cross-sectional configurations, such as polygon shapes, elliptical shapes; etc. Preferably, the ring 14 is formed to have an inner surface that substantially conforms to the configuration of the rods R and thus, the particular configuration of the ring 14 and the rods R is not important, as long as the configurations substantially correspond. Moreover, although the representative embodiments have been described in terms of metal rods R, such rods R may be any type of material that may be melted and then further processed or manipulated in a liquid state. For example, metal-plastic mixtures and other non-metal polymer compositions are also expressly contemplated by the present teachings.

Moreover, the means for shearing or shredding the softened material within the melting chamber (e.g., heating cylinder) is not limited to the screen disk 18 and rotation of the softened material (e.g., by parallel spiral projections 57) according the above-representative embodiments. Various other mechanical devices can be utilized the shear or cut up the softened material into smaller pieces in order to aid the melting process. Further, such shredding means are optional and may not be included in devices and methods prepared according to the present teachings.

The invention claimed is:

1. A molten material supply unit comprising:
   a heating cylinder constructed and arranged for receiving a solid material rods, and comprising an inlet open to the atmosphere which receives the solid material rods and an outlet spaced from the inlet; and
   a vacuum device communicating with the heating cylinder between the solid material rod received at the inlet and the outlet spaced from the inlet, and constructed and arranged to generate a reduced pressure environment within the heating cylinder,
   wherein the solid material rods are heated and melted in the reduced pressure environment as the rods move from the inlet to the outlet.

2. A molten metal supply unit as in claim 1, wherein the vacuum device comprises a vacuum pump that is disposed adjacent to the heating cylinder in a position near an inlet of the heating cylinder.

3. A molten material supply unit as in claim 1, additionally comprising means for successively supplying the solid material rods into the heating cylinder via the inlet.

4. A molten material supply unit as in claim 3, wherein the solid material rods are made of metal.

5. A molten material supply unit as in claim 3, further including a pusher device that is adapted to push the solid material rods into the heating cylinder.

6. A molten material supply unit as in claim 5, further including a squeezing member disposed at the inlet of the heating cylinder, wherein the squeezing member has an inner diameter slightly smaller than an outer diameter of the solid material rods, so that an outer surface of the solid material rods is scraped as the solid material rods are pushed into the heating cylinder.

7. A molten material supply unit as in claim 3, further including a preheating device that is adapted to heat the solid material rods so as to preheat and soften the solid material rods before the rods are pushed by a pusher device.

8. A molten material supply unit as in claim 5, wherein the pushing device comprises a piston constructed and arranged to contact a rear end of each solid material rod and to move each solid material rod by a predetermined stroke in order to push the solid material rods into the heating cylinder.

9. A molten material supply unit as in claim 1, wherein the heating cylinder has an inner wall that is covered with a protective layer that does not chemically react with the melted material within the heating cylinder.

10. A molten material supply unit as in claim 9, wherein the protective layer is made of at least one material selected from the group consisting of ceramic, ceramic-metal composite and chromium oxide.

11. A molten material supply unit comprising:
    a heating cylinder constructed and arranged for receiving solid material rods, and comprising an inlet open to the atmosphere to receive the solid material rods, which inlet comprises a squeezing device constructed and arranged to accommodate the solid material rods in a sealing manner,
    an outlet spaced apart from the inlet, and
    a vacuum device communicating with the heating cylinder and constructed and arranged to generate a reduced pressure within the heating cylinder,
    wherein the squeezing device substantially forms a seal with the solid material rods as the solid material rods move through the squeezing device, and
    wherein the solid material rods are heated and melted in the reduced pressure environment as the solid material rods move from the inlet towards the outlet.

12. A molten material supply unit as in claim 11, additionally comprising a pusher device constructed and arranged to push the solid material rods into the inlet of the heating cylinder.

13. A molten material supply unit as in claim 11, additionally comprising:
    a preheating device constructed and arranged to preheat and soften the solid material rods; and
    a pusher device constructed and arranged to push the solid material rods into the inlet of the heating cylinder,
    wherein the preheating device preheats the solid material rods prior to the pusher device inserting the solid material rods into the inlet of the heating cylinder.

14. A molten material supply unit comprising:
    a preheating device constructed and arranged to preheat a plurality of solid material rods;
    a heating cylinder constructed and arranged for receiving and heating the preheated solid material rods under substantially vacuum conditions within the heating cylinder, wherein the heating cylinder includes an inlet open to the atmosphere and an outlet spaced apart from the inlet;

a pushing device constructed and arranged to push the preheated solid material rods successively into the heating cylinder via the inlet, so that the preheated solid material rods move successively within the heating cylinder toward the outlet;

a squeezing member disposed an the inlet of the heating cylinder having an inner diameter slightly smaller than an outer diameter of the preheated solid material rods, so that the preheated solid material rods substantially form a seal with the squeezing member as the solid material rods are pushed into the heating cylinder; and a vacuum device communicating with the heating cylinder and constructed and arranged to generate the substantially vacuum conditions within the heating cylinder.

* * * * *